United States Patent [19]

Kasper et al.

[11] 4,455,659

[45] Jun. 19, 1984

[54] COAXIAL BUS AND BUS SYSTEM

[75] Inventors: James J. Kasper, Sheffield Lake, Ohio; George E. Bosch, Detroit, Mich.; Craig A. Smith, North Ridgeville, Ohio

[73] Assignee: Watteredge-Uniflex, Inc., Avon Lake, Ohio

[21] Appl. No.: 354,907

[22] Filed: Mar. 4, 1982

[51] Int. Cl.$^3$ .............................................. C03B 5/027

[52] U.S. Cl. ....................................................... 373/39

[58] Field of Search ........................ 373/27, 29, 39, 40, 373/41, 103, 135, 139, 147; 174/50.55, 152 R

[56] References Cited

U.S. PATENT DOCUMENTS

| | | | |
|---|---|---|---|
| 1,584,612 | 5/1926 | Coates et al. | 174/152 R |
| 2,278,974 | 4/1942 | Christensen | 174/152 R |
| 2,591,708 | 4/1952 | Lubatti | 373/41 |
| 2,809,358 | 10/1957 | Whitney | 174/50.55 X |
| 3,270,177 | 8/1966 | Prediger et al. | 373/139 |

*Primary Examiner*—Roy N. Envall, Jr.

*Attorney, Agent, or Firm*—Maky, Renner, Otto & Boisselle

[57] ABSTRACT

A coaxial bus and bus system for electric furnaces which significantly reduces and minimizes heating and losses due to magnetic induction effects are characterized by a concentric tubular bus stem connected at one end to a transformer and branching at the other end to be connected to the furnace. The bus stem includes concentric tubular conductors which are connected at such one end to the transformer by respective diametrically opposed terminal lugs. At such other end, bus branches each including a conductive cross bar and a flexible feeder are respectively connected to the tubular conductors and form a yoke between which the furnace heating element or elements may be connected. The feeders are adjustably secured both pivotally to and longitudinally along their respective cross bars and each includes a plurality of stacked conductive leaves which are pressure welded together and to contact and reinforcing plates at their ends. Provision also is made for air or water cooling by means of coolant passages in the terminal lugs, bus stem and bus branches.

26 Claims, 7 Drawing Figures

COAXIAL BUS AND BUS SYSTEM

DISCLOSURE

This invention relates generally to electric furnaces and more particularly to a bus and bus system especially suited for an electric glassmaking furnace.

BACKGROUND OF THE INVENTION

In electric glassmaking furnaces and the like, buses and bus systems are employed to carry the electrical current from a transformer to the electric heating element or elements of the furnace, such heating elements being, for example, induction or resistance electrodes. One known bus system employs a squared Y-shape bus consisting of jointed bus bars or elements. The rectangular parallel bus bars forming the stem of the bus are connected by terminal lugs to respective contact pads of the transformer and extend therefrom in relatively closely spaced, parallel relationship. At their ends remote from the transformer, these bus bars have connected thereto a respective conductive cross bar. The cross bars extend laterally in opposite directions and have conductive flexible feeders or jumpers respectively mounted thereon at their distal ends. The feeders typically are parallel and have contact plates thereon to which the heating element or elements, or conductive brackets or jumpers therefor, are connected. The conductive feeders desirably are laterally flexible to accommodate thermal expansion effects and those heretofore employed with electric glassmaking furnaces have been formed from a plurality of stacked copper leaves which are riveted, soldered, or mig welded together and to the contact plates at their ends.

Such known system has the disadvantage that it is subject to significant heating and losses due to magnetic induction effects and the joints employed therein. In particular, a relatively large voltage drop occurs in the bus stem where magnetic induction effects are the greatest. Each joint also has a voltage drop associated therewith as do the contact plate-feeder leaf interfaces.

SUMMARY OF THE INVENTION

The present invention provides a novel coaxial bus and bus system for electric furnaces and particularly glassmaking furnaces which significantly reduce and minimize the above mentioned heating and losses. In addition, the present invention also provides for effective air or water cooling of the bus.

Briefly, a furnace bus system according to the invention comprises a concentric tubular bus stem connected at one end to a transformer and branching at the other end to be connected to the furnace. The bus stem includes opposite polarity, concentric tubular conductors which are radially spaced apart and form a first coolant passage therebetween and a second coolant passage in the interior of the inner tubular conductor.

More particularly, the concentric tubular conductors of the bus stem are connected at such one end of the bus stem to the transformer by respective, diametrically opposed terminal lugs and at such other end of the bus stem to respective bus branches to be connected to the furnace or, more accurately, the heating element or elements of the furnace. The tubular conductors preferably are radially spaced apart by annular insulating spacers which additionally define the ends of the first or outer coolant passage, such insulating spacers being axially spaced apart and sealed to the tubular conductors at opposite ends thereof. Respective coolant passages in the terminal lugs and bus branches are connected to adjacent ends of the first and second coolant passages in the bus stem whereby coolant may be passed from inlets in the terminal lugs to outlets in the bus branches via the bus stem, or vice versa. The bus branches of the bus include respective, oppositely extending conductive cross bars or rods to which respective feeders are secured. Each feeder preferably is formed of a plurality of juxtaposed conductive leaves which are pressure welded together and to juxtaposed contact and reinforcing plates at the ends thereof.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION

Figure 1:
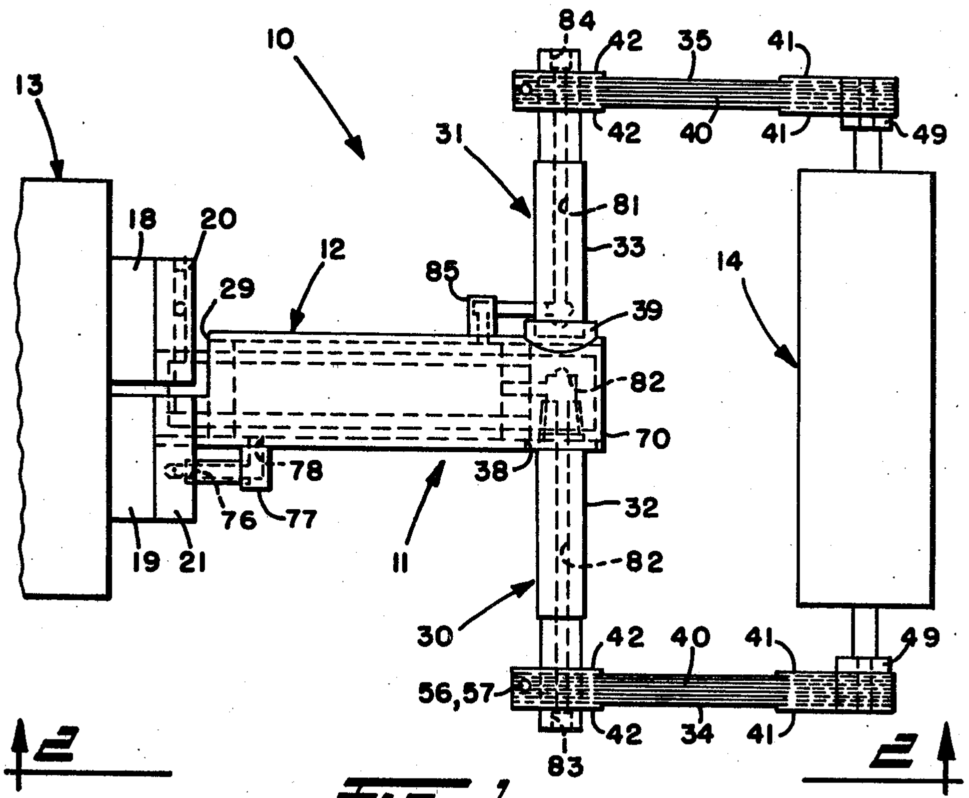
FIG. 1 is a top plan view of a furnace bus system according to the invention.

Referring now in detail to the drawings and initially to FIG. 1, a furnace bus system according to the invention is designated generally by reference numeral 10. The bus system 10 comprises a coaxial bus which can be seen in FIG. 1 to have a squared-Y configuration in top plan view. The coaxial bus 11 is particularly characterized by a concentric tubular bus stem 12 connected at one end to a transformer 13 and branching at the other end to be connected to an electric glassmaking furnace shown schematically at 14. The coaxial bus 11 is particularly suited for use with electric glassmaking furnaces and particularly those employing low voltage (12 volts or less), high current (4–8000 amps) system; however it is contemplated that such bus and the principles of this invention may be employed with other types of electric furnaces to obtain the advantages and improved performance resulting therefrom.

Figure 2:
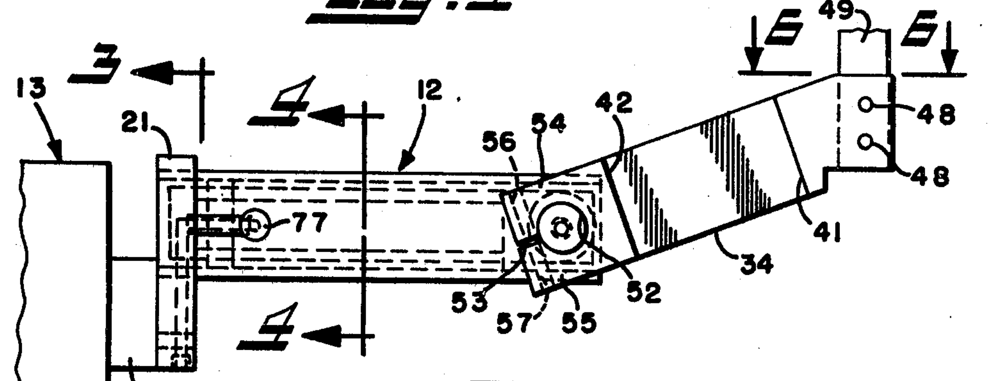
FIG. 2 is a side elevation of the furnace bus system of FIG. 1 as viewed from the line 2—2 thereof.
Figure 4:
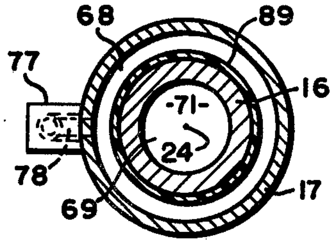
FIG. 4 is another enlarged transverse vertical section of the furnace bus system of FIG. 1 taken along the line 4—4 of FIG. 2.
Figure 3:
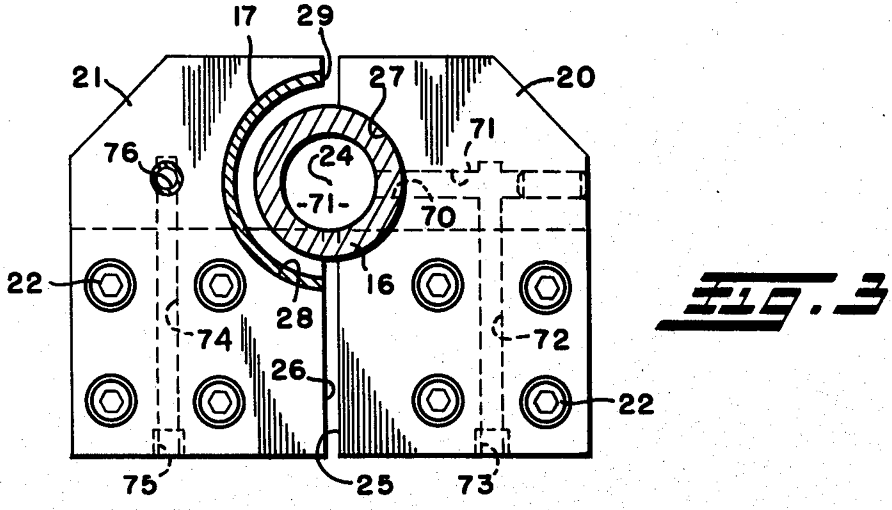
FIG. 3 is an enlarged transverse vertical section through the furnace bus system of FIG. 1 taken along the line 3—3 of FIG. 2.

With additional reference to FIGS. 2–4, the concentric tubular bus stem 12 can be seen to include concentric cylindrical conductors 16 and 17 which are radially spaced apart and preferably have substantially equal cross-sectional areas. Accordingly, the inner cylindrical conductor 16, which preferably is tubular for reasons that will become apparent below, will have a wall thickness greater than that of the outer, larger diameter cylindrical conductor 17 which necessarily is tubular. Although the conductors 16 and 17 may be made of any suitable conducting material, they preferably are made of copper.

The tubular conductors 16 and 17 respectively are removably secured to the opposite polarity contact pads or plates 18 and 19 of the transformer 13 by terminal lugs 20 and 21 and suitable fasteners commonly designated by reference numeral 22. The terminal lugs 20 and 21 generally are in the form of flat plates and, for flush contact with the contact pads 18 and 19 of the illustrated transformer, reside in a common plane which is normal to the common axis 24 of the tubular conductors 16 and 17. Preferably, the terminal lugs are made of the same conducting material as the tubular conductors as are all the other hereinafter described conducting elements of the coaxial bus 11.

As best seen in FIG. 3, the terminal lugs 20 and 21 are diametrically opposed about the common axis 24 of the tubular conductors 16 and 17 and have respective, oppositely facing adjacent edges 25 and 26. The edges 25 and 26 have therein respective semicircular grooves or indentations 27 and 28 whereat the terminal lugs 20 and 21 are respectively secured to the outer diameters of the tubular conductors 16 and 17 such as by welding or soldering. Preferably, the joints between the tubular conductors and terminal lugs are brazed or soldered with a high temperature, high strength and high conductivity solder or brazing metal such as silver solder or brazing metal to ensure a good conductive path therebetween. In order to accommodate the terminal lug 20 secured to the inner tubular conductor 16 as indicated, the outer tubular conductor 17 has a diametrical half section recess 29 at its proximal end which is best seen in FIG. 1.

Referring now to the branched end of the coaxial bus 11, such can be seen in FIGS. 1 and 2 to comprise opposed bus branches 30 and 31 which respectively include laterally extending conductive cross pieces or bars 32 and 33 to which respective conductive feeders 34 and 35 are secured. The conductive cross bars and feeders carry the current from the bus stem 12 to the electric heating element or elements of the furnace 14 which may be supported thereby and/or by some other support within the furnace. The feeders extend perpendicularly from their respective cross bars and usually are parallel, and to accommodate thermal expansion effects, the feeders desirably should offer only limited resistance to a small degree of lateral flexure so as to serve as expansion joints between the cross bars and furnace.

Figure 5:
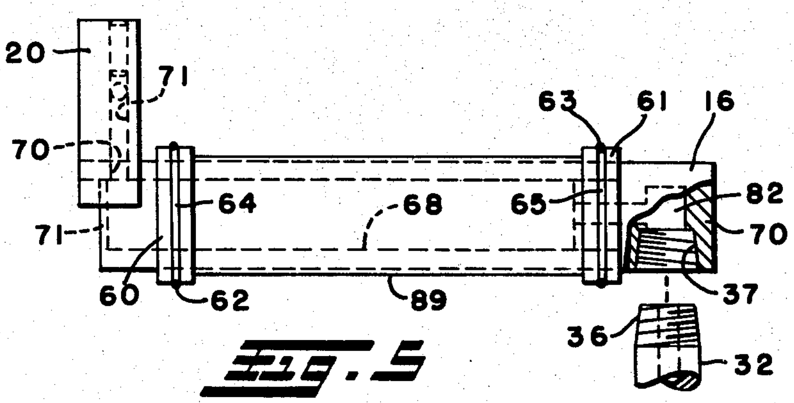
FIG. 5 is a partly exploded and sectioned, enlarged side elevation showing the inner tubular conductor of the furnace bus system of FIG. 1 and various elements associated therewith.

The cross bars 32 and 33 respectively are secured to the tubular conductors 16 and 17 and extend laterally in opposite directions. The cross piece 32 preferably has a tapered threaded end 36 which may be threaded in a correspondingly tapered threaded bore 37 in the inner tubular conductor 16 as best seen in FIG. 5, and a suitable opening or aperture 38 is provided in the outer tubular conductor 17 for passage of the cross bar 32 therethrough. The cross bar 33 could be similarly secured to the outer tubular conductor 17 except that it may not be sufficiently thick enough to support the cross bar and effect an adequate electrical path. The cross piece 33 therefore is desirably received in a collar 39 provided on the outer diameter of the outer tubular conductor 17 and is secured therein such as by welding or soldering. To ensure a good conducting path between the tubular conductors and cross bars, preferably the joints are soldered or brazed with a high temperature, high conductivity solder or brazing metal such as silver solder or brazing metal.

Figure 6:
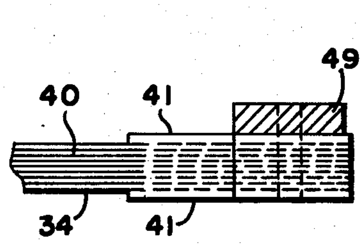
FIG. 6 is an enlarged and fragmented longitudinal horizontal section through the furnace bus system of FIG. 1 taken along the line 6—6 of FIG. 2.

Reference now being had to the feeders 34 and 35, each is formed from a plurality of juxtaposed or stacked conductive, and preferably copper, leaves of like shape which are collectively designated by reference numeral 40. At the terminal end of each feeder, the leaves are pressure welded together and to juxtaposed contact plates 41 at opposite sides thereof as best seen in FIG. 6. The contact plates 41 may be of a heavier gauge copper than the leaves and further may act as reinforcing members in the area of the pressure weld. At the other end of each feeder, the leaves also are pressure welded together and to juxtaposed contact or reinforcing plates 42 at opposite sides thereof.

Figure 7:
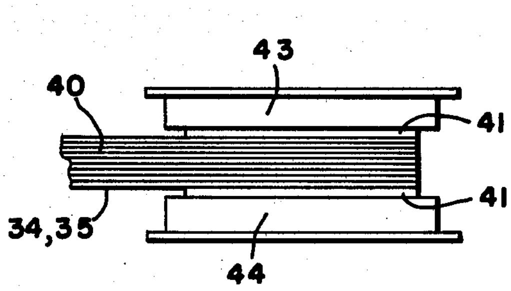
FIG. 7 is an enlarged and fragmented plan view showing the manner in which the ends of the conductive feeders of the system are bonded together.

In FIG. 7, the terminal end of a feeder is shown just prior to it being pressure welded. As shown, the leaves 40 and contact plates 41 are stacked together between large non-stick electrodes 43 and 44 of a pressure welding machine. Welding pressure and current is then controllably applied to pressure bond the laminations together, such welding operation being similar to that of a spot welder employing large, non-stick electrodes and precisely controllable current input and timing and electrode pressures and hold times. The constant and impulse current function important to quality bonding may be electronically controlled and welding pressure may be effected by controllable pneumatically-operated cylinders so that proper pressures are attained and repeated for consistent joints.

The electrical losses in pressure welded copper laminates of this type have been found to be no greater than those in a solid copper conductor of the same cross section. Such laminates also prevent interlaminate oxidation or corrosion which would adversely affect electrical continuity. Moreover, the operating temperature is the same as copper as no relatively low-temperature materials such as solder are involved.

The pressure welded laminates may also be sawed or drilled both laterally and parallel with respect to the plane of the laminations without affecting the solid electrical path formed by the pressure bonding of the laminations. Reverting to FIGS. 1 and 2, it can be seen that the terminal end of each feeder 34, 35 may be laterally bored to provide fastener holes commonly designated by reference numeral 48. The holes 48 may be employed to secure a heating element or heating element bracket or jumper 49 to the terminal end of the feeder flush with a contact plate 41.

The other end of each feeder 34, 35 may be drilled to provide a laterally extending bore 52 for receipt of the cylindrically machined end of the respective cross bar 32, 33. Such end further is provided with a longitudinal slot extending from the bore 52 to the end face of the feeder thereby to form opposed clamping arms 54 and 55. The clamping arms 54 and 55 may be tightly clamped about the end of the cross bar by a suitable fastener secured in aligned bores 56 and 57 at the distal ends of the clamping arms. It should not be apparent that the feeders may be pivotally adjustably secured to their respective cross bars as well as longitudinally adjusted along the cross bars to vary the lateral spacing therebetween.

Particular reference now being had to FIGS. 3-5, it will be seen that the coaxial bus 11 has provision for gas or liquid cooling. The tubular conductors 16 and 17 are radially spaced apart by means of annular insulating spacers 60 and 61 located at opposite ends thereof. It of course will be appreciated that the tubular conductors also additionally are maintained in spaced relation when secured to the transformer 13 as above indicated. Each insulating spacer may be made of any suitable insulating material, but preferably is made of a heat shrinkable polymer such as PVC plastic so that it can be shrunk fit on the outer diameter of the inner tubular conductor 16. Each insulating spacer accordingly will be securely locked in place on the inner tubular conductor and form a tight seal therewith.

The insulating spacers 60 and 61 also are sealed to the inner diameter of the outer tubular conductor 17. As shown, such seal may be effected by suitable annular seals or O-rings 62 and 63 which preferably are retained in annular grooves 64 and 65 on the outer peripheral edges of the spacers 60 and 61, respectively. It thus can be appreciated that the insulating spacers 60 and 61 form dams or seals at the ends of an outer coolant passage 68 formed between the tubular conductors 16 and 17, whereas the interior of the inner tubular conductor 16 forms an inner coolant passage 69. The ends of the inner coolant passage 69 are formed by the closed end or end wall 70 of the inner tubular conductor and the plug 71 closing the other end of the inner tubular conductor.

The inner coolant passage 68 is connected at one end by a radial passage 70 in the side wall of the inner tubular conductor 16 to a radial coolant passage 71 in the terminal lug 20. The passage 71 in turn is connected to a downwardly extending coolant passage 72 in the terminal lug 20 which terminates at an inlet or outlet port 73 that may be threaded for receipt of a coolant supply or return tube fitting. The other terminal lug 21 has a similar downwardly extending coolant passage 74 and inlet or outlet port 75, but the coolant passage 74 is externally connected to the proximal end of the outer coolant passage 68 by means of an axial coolant passage 76, external L-shape fitting 77 and a radial passage 78 in the wall of the outer tubular conductor 17 as best seen in FIGS. 1 and 2.

At their ends adjacent the cross bars 32 and 33, the coolant passages 68 and 69 respectively are connected to longitudinal coolant passages 80 and 81 in the cross bars 32 and 33. The coolant passage 80 in the cross bar 32 opens to an axial passage 82 in the end wall 70 of the inner tubular member which axial passage is in communication with the adjacent end of the inner coolant passage 69. The coolant passage 80 also preferably extends the full length of the cross bar 32 to an inlet or outlet port 83 provided at the remote end thereof. The coolant passage 81 in the cross bar 33 similarly terminates at an inlet or outlet port 84 at the remote end thereof and extends substantially the full length of the cross bar 33. The proximal end of the coolant passage 81, however, is externally connected to the outer coolant passage 68 of the bus stem 12 via an external L-shape fitting 85.

It now can be seen that the various coolant passages provide two mutually electically isolated flow paths for coolant. One flow path passes through the terminal lug 21, the outer coolant passage 68 of the bus stem 12 and the cross bar 33, whereas the other coolant path passes through the terminal lug 18, the inner coolant passage 69 of the bus stem 12 and the cross bar 32. Coolant may flow through each path in either direction with the inlet and outlet ports in the terminal lugs and cross bars being accordingly connected to respective coolant supplies and returns. Moreover, either a gas or liquid coolant may be employed such as air or water. If a conductive liquid coolant such as water is employed, the coolant in the outer coolant passage 68 must be electrically isolated from at least one of the tubular conductors 16 and 17 such as by means of an insulating sheath 89 seen in FIGS. 4 and 5. Such insulating sheath 89, which may be made of PVC plastic, is fitted on the outer diameter of the inner tubular conductor 16 and cemented at its ends to the insulating spacers 60 and 61.

With the welded flexible feeder arms which include the contact plates at the terminations, a 4 to 5 percent better connection is obtained than with prior art terminations. Also, the coaxial bus throughout the stem not only provides the desired rigid support but reduces reactants and obtains an approximate 28 percent reduction in voltage drop in the coaxial section. Accordingly a significantly more energy efficient bus system is provided.

Although the invention has been shown and described with respect to a preferred embodiment, it is obvious that equivalent alterations and modifications will occur to others skilled in the art upon the reading and understanding of the specification. The present invention includes all such equivalent alterations and modifications, and is limited only by the scope of the following claims.

What is claimed is:

1. A bus system for connecting between two electrode connections of a furnace and respective output terminals of a transformer, said system comprising a bus stem having first and second tubular concentric conductors, first connection means for connecting a first end portion of each of said conductors with a respective one of the output terminals of the transformer, a pair of branch conductors each connected with an opposite end portion of a respective one of said tubular conductors, and second connection means for connecting each of the branch conductors with a respective electrode connection on the furnace.

2. A system as set forth in claim 1 wherein said tubular conductors are radially spaced apart and form therebetween a first coolant passage, and the interior of the inner tubular conductor forms a second coolant passage.

3. A system as set forth in claim 2 including axially spaced annular insulating spacers for said tubular conductors forming the ends of said first coolant passage.

4. A system as set forth in claim 3 wherein said spacers are shrink fitted on the inner tubular conductor and sealed to the outer tubular conductor.

5. A system as set forth in claim 2 including an annular insulating sheath interposed between said tubular conductors for electrically isolating coolant passing through said first coolant passage from at least one of said tubular conductors.

6. A system as set forth in claim 5 including spacers for holding said tubular conductors spaced apart and wherein said annular insulating sheath is fitted on said one of said tubular conductors and cemented to said spacers.

7. A system as set forth in claim 2 wherein said first connection means includes diametrically opposed terminal lugs connected with respective tubular conductors, and said terminal lugs each include a coolant passage connected to a respective one of said first and second coolant passages.

8. A system as set forth in claim 2 wherein each branch conductor includes a coolant passage connected to a respective one of said first and second coolant passages.

9. A system as set forth in claim 1 wherein said first connection means includes diametrically opposed terminal lugs connected with respective tubular conductors.

10. A system as set forth in claim 9 wherein each terminal lug has a semicircular groove therein and is secured at such groove to the outer diameter of the respective tubular conductor.

11. A system as set forth in claim 10 wherein the terminal lug secured to the inner tubular conductor has a diametrical half section recess accommodating the other terminal lug in spaced relationship.

12. A system as set forth in claim 1 wherein said branch conductors each include a laterally extending, conductive cross bar connected at one end to the respective tubular conductor and a conductive feeder connected to the other end of said cross bar.

13. A system as set forth in claim 12 wherein said feeder is adjustably secured both pivotally to and longitudinally along said cross bar.

14. A system as set forth in claim 12 wherein said feeder includes a plurality of stacked conductive leaves pressure welded together at their ends.

15. A system as set forth in claim 14 wherein said second connection means includes at least one contact plate pressure welded to said feeder at the terminal end thereof to be connected to the furnace.

16. A system as set forth in claim 12 wherein the cross bar for said inner tubular conductor is secured in a radial bore in said inner tubular conductor.

17. A system as set forth in claim 12 wherein the cross bar for said outer tubular conductor is secured in a collar on the outer diameter of said outer tubular conductor.

18. A system as set forth in claim 4 wherein each spacer includes an annular groove in the outer peripheral edge thereof and an annular seal retained in said groove.

19. A bus system for connecting a pair of transformer output terminals with a corresponding pair of spaced apart furnace input terminals, said system including a coaxial pair of conductors forming a bus stem adapted to extend from the output terminals toward a furnace, at least one of said conductors being tubular, and a pair of branch conductors extending transverse to the axes of said coaxial conductors and each connected with one of said coaxial conductors and adapted to extend toward one of a pair of spaced apart furnace input terminals.

20. A bus system as set forth in claim 19 including respective, diametrically opposed terminal lugs on said concentric conductors at said one end of said bus stem.

21. A bus as set forth in claim 20 including two mutually electrically isolated, coolant flow paths through said terminal lugs, bus stem and branch conductors.

22. A bus as set forth in claim 21 wherein said concentric conductors are both tubular and form therebetween a first coolant passage, and the interior of the inner tubular conductor forms a second coolant passage.

23. A bus as set forth in claim 22 including axially spaced annular insulating spacers for the tubular conductors forming the ends of said first coolant passage.

24. A bus as set forth in claim 19 wherein said conductors terminate at respective feeders connectable at their terminal ends to furnace input terminals.

25. A bus as set forth in claim 24 wherein said feeders each include a plurality of stacked conductive leaves pressure welded together at their ends.

26. A bus as set forth in claim 24 wherein said feeders each includes a plurality of stacked conductive leaves pressure welded together and to a juxtaposed contact plate at the terminal end thereof.

* * * * *